US012801234B2

(12) United States Patent
Zhong et al.

(10) Patent No.: US 12,801,234 B2
(45) Date of Patent: Nov. 17, 2026

(54) PROCESSING METHOD AND ELECTRONIC DEVICE

(71) Applicant: Lenovo (Beijing) Limited, Beijing (CN)

(72) Inventors: Ling Zhong, Beijing (CN); Jianlin Nie, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 19/003,562

(22) Filed: Dec. 27, 2024

(65) Prior Publication Data

US 2026/0118987 A1 Apr. 30, 2026

(30) Foreign Application Priority Data

Dec. 29, 2023 (CN) ......................... 202311865673.9

(51) Int. Cl.

| | |
|---|---|
| ***G06F 3/041*** | (2006.01) |
| ***G06F 3/0354*** | (2013.01) |
| ***G06F 3/044*** | (2006.01) |
| ***G06V 40/13*** | (2022.01) |

(52) U.S. Cl.

CPC ............ *G06F 3/0416* (2013.01); *G06F 3/044* (2013.01); *G06V 40/1306* (2022.01); *G06F 3/03547* (2013.01); *G06F 2203/0339* (2013.01)

(58) Field of Classification Search

None

See application file for complete search history.

(56) References Cited

U.S. PATENT DOCUMENTS

2020/0097698 A1* 3/2020 Seo .................. G06F 3/041661
2024/0289012 A1* 8/2024 Chang .................. G06F 3/0484

* cited by examiner

*Primary Examiner* — Stephen T. Reed

(74) *Attorney, Agent, or Firm* — ANOVA LAW GROUP, PLLC

(57) ABSTRACT

A processing method includes obtaining a touch event through a fingerprint sensor, in response to the touch event, obtaining direction information through the fingerprint sensor, in response to the touch event, obtaining a start coordinate, and based on the direction information and the start coordinate, constructing at least one target coordinate until a leaving event is obtained through the fingerprint sensor. The touch event represents a target finger touching a collection area of the fingerprint sensor. The direction information represents a swiping direction of the target finger relative to the collection area. The start coordinate is in a display area of a screen. Any one coordinate of the start coordinate and the at least one target coordinate is used to control a display object in the display area to move in a direction indicated by the direction information.

20 Claims, 6 Drawing Sheets

PROCESSING METHOD AND ELECTRONIC DEVICE

CROSS REFERENCE TO RELATED APPLICATION

The present disclosure claims priority to Chinese Patent Application No. 202311865673.9, filed on Dec. 29, 2023, the entire content of which is incorporated herein by reference.

TECHNICAL FIELD

The present disclosure is related to the information processing technology field and, more particularly, to a processing method and an electronic device.

BACKGROUND

When a user rides a car or operates an electronic device, it may be difficult to perform a sliding operation on the touch screen of the electronic device to control a page on the screen to move up and down. To conveniently control the page on the screen of the electronic device to move up and down, a fingerprint sensor is arranged on the side of the electronic device. The fingerprint sensor on the side will be widely used to sense the fingerprint of the user.

However, to allow the system to obtain the sliding of the fingerprint in time, the fingerprint sensor needs to continuously collect feature information of the fingerprint and report to the system. Thus, the power consumption of the electronic device is relatively high.

SUMMARY

One aspect of the present disclosure provides a processing method. The method includes obtaining a touch event through a fingerprint sensor, in response to the touch event, obtaining direction information through the fingerprint sensor, in response to the touch event, obtaining an start coordinate, and based on the direction information and the start coordinate, constructing at least one target coordinate until a leaving event is obtained through the fingerprint sensor. The touch event represents a target finger touching a collection area of the fingerprint sensor. The direction information represents a swiping direction of the target finger relative to the collection area. The start coordinate is in a display area of a screen. Any one coordinate of the start coordinate and the at least one target coordinate is used to control a display object in the display area to move in a direction indicated by the direction information.

Another aspect of the present disclosure provides an electronic device including a fingerprint sensor and one or more processors. The fingerprint sensor is configured to obtain a touch event, in response to the touch event, determine direction information, and obtain a leaving event. The touch event represents that a target finger touches a collection area of the fingerprint sensor. The direction information represents a swiping direction of the target finger relative to the collection area. The one or more processors are configured to obtain the touch event and the direction information reported by the fingerprint sensor, in response to the touch event, obtain an start coordinate, and construct at least one target coordinate based on the direction information and the start coordinate until the fingerprint sensor obtains the leaving event. The start coordinate is in a display area of a screen. Any one coordinate of the start coordinate and the at least one target coordinate is used to control a display object of the display area to move in a direction indicated by the direction information.

Another aspect of the present disclosure provides a non-transitory computer-readable storage medium storing a computer program that, when executed by one or more processors, causes the one or more processors to obtain a touch event through a fingerprint sensor, in response to the touch event, obtain direction information through the fingerprint sensor, in response to the touch event, obtain an start coordinate, and based on the direction information and the start coordinate, construct at least one target coordinate until a leaving event is obtained through the fingerprint sensor. The touch event represents a target finger touching a collection area of the fingerprint sensor. The direction information represents a swiping direction of the target finger relative to the collection area. The start coordinate is in a display area of a screen. Any one coordinate of the start coordinates and the at least one target coordinate is used to control a display object in the display area to move in a direction indicated by the direction information.

DETAILED DESCRIPTION OF THE EMBODIMENTS

The technical solutions of embodiments of the present disclosure are described in detail in connection with the accompanying drawings of embodiments of the present disclosure. Apparently, described embodiments are merely some embodiments of the present disclosure, not all embodiments. Based on embodiments of the present disclosure, all other embodiments obtained by those skilled in the art without creative efforts are within the scope of the present disclosure.

Figure 1:
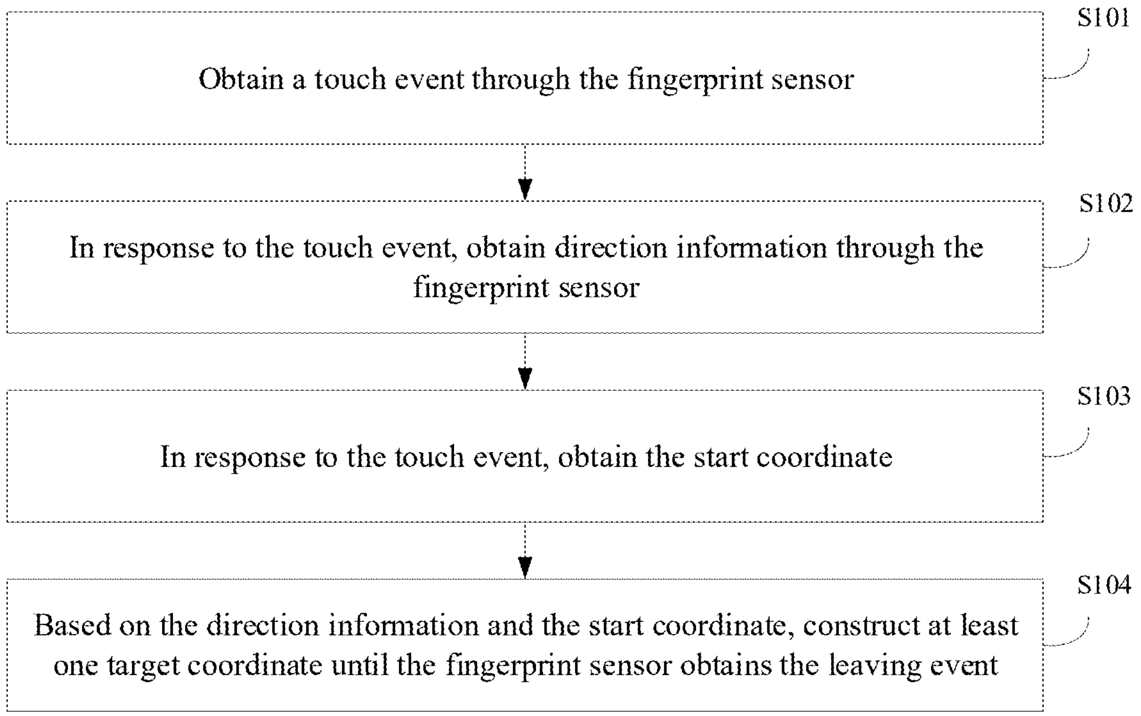
FIG. 1 illustrates a schematic flowchart of a processing method according to some embodiments of the present disclosure.

FIG. 1 illustrates a schematic flowchart of a processing method according to some embodiments of the present disclosure. The method can be applied to an electronic device. The electronic device includes a fingerprint sensor. The method includes the following processes.

At S101, a touch event is obtained through the fingerprint sensor.

The fingerprint sensor can collect a fingerprint image of user fingers or sense a capacitor change generated when the user fingers touch the fingerprint sensor to sense an operation behavior of the user fingers. For example, the fingerprint of the collected finger touches a collection area of the fingerprint sensor, the fingerprint of the finger leaves the collection area, and the fingerprint of the finger moves in the collection area.

The fingerprint sensor is different from the touch sensor arranged on a touch screen. The collection area of the fingerprint sensor can be in an area outside the screen of the electronic device. Correspondingly, based on the fingerprint sensor of the electronic device, the fingerprint swiping operation of the user can be detected in the collection area outside the screen such as the touch screen of the electronic device.

One or more fingerprint sensors of the electronic device can be provided. For example, electronic devices can include a group of fingerprint sensors. The group of fingerprint sensors can include a plurality of fingerprint sensors.

In some embodiments, the fingerprint sensors can be arranged at different positions of the electronic device.

For example, in some embodiments, the fingerprint sensor can be arranged on a side surface of the target body of the electronic device. The target body can be the body where the screen is located. The side surface can be perpendicular to the plane where the screen is located.

Figure 2:
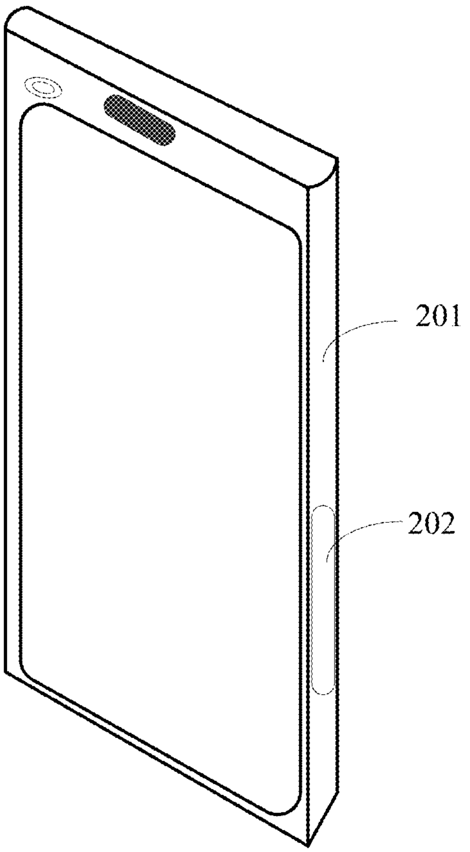
FIG. 2 illustrates a schematic diagram showing a position of a collection area of a fingerprint sensor at an electronic device according to some embodiments of the present disclosure.

FIG. 2 illustrates a schematic diagram showing a position of a collection area of a fingerprint sensor at an electronic device according to some embodiments of the present disclosure. As shown in FIG. 2, the electronic device is a cell phone. The fingerprint sensor is vertically arranged at the side surface 201 of the cell phone. Thus, the side surface 201 can include a collection area 202 of the fingerprint sensor. The collection area 202 can be a strip-shaped area parallel to the side surface. When the user holds the cell phone, the user finger can perform an up-and-down swiping operation in the collection area of the fingerprint sensor.

FIG. 2 is also suitable when the electronic device is a tablet, which is not limited.

FIG. 2 is merely an example. The fingerprint sensor can be also arranged at a horizontal side surface of the target body of the electronic device. Thus, the collection area of the fingerprint sensor is parallel to the horizontal side of the electronic device in FIG. 2 to allow the user to swipe horizontally along the collection area of the fingerprint sensor to control the display object of the screen to move right and left.

In some other embodiments, the fingerprint sensor can be arranged on a back surface of the target body of the electronic device. The back surface of the target body can be the surface in parallel to the surface where the screen of the target body is located.

When the fingerprint sensor is at the back surface of the target body of the electronic device, the user finger can swipe in the collection area corresponding to the fingerprint sensor at the back surface of the target body to control the display object such as the page, document, or web page in the screen of the electronic device to roll or move.

When the fingerprint sensor is at the back surface of the target body of the electronic device, the collection area of the fingerprint sensor can be parallel to any one side of the electronic device, which is not limited.

Figure 3:
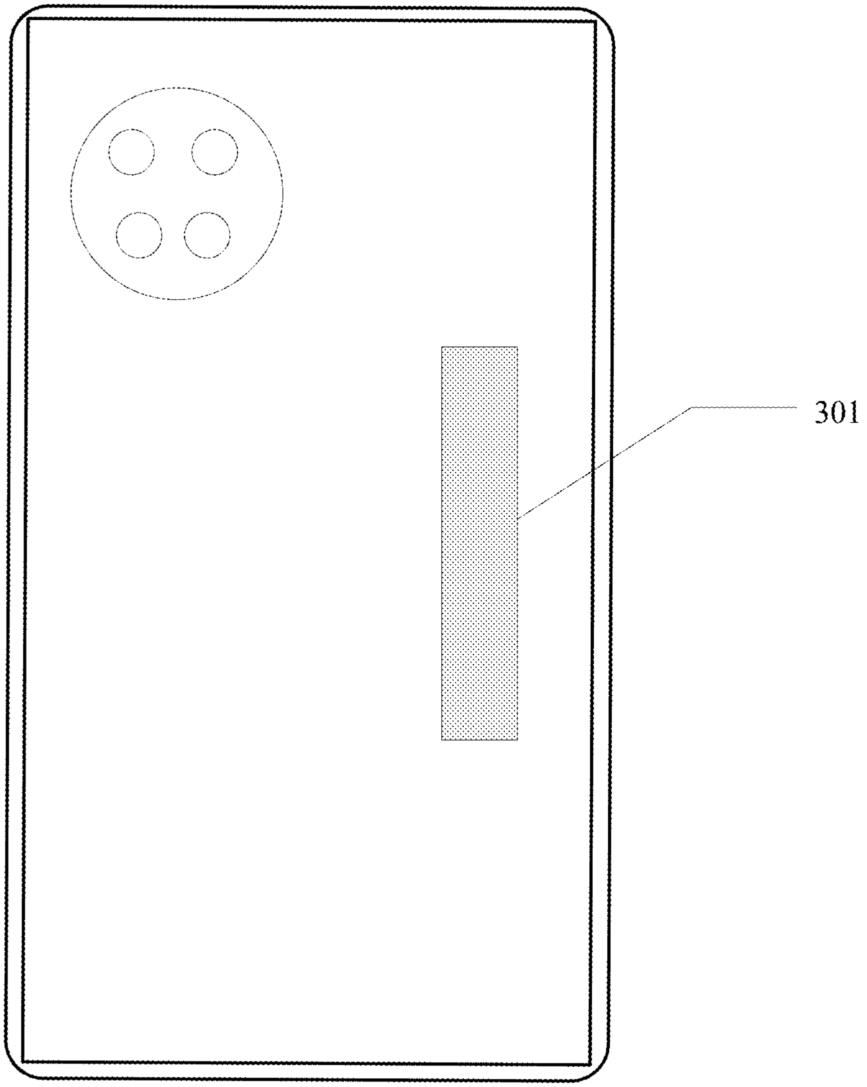
FIG. 3 illustrates another schematic diagram showing a collection area of a fingerprint sensor at an electronic device according to some embodiments of the present disclosure.

FIG. 3 illustrates another schematic diagram showing a collection area of a fingerprint sensor at an electronic device according to some embodiments of the present disclosure. The collection area 301 of the fingerprint sensor of FIG. 3 is in a strip shape and parallel to the vertical side of the electronic device. Thus, in the collection area of the fingerprint sensor, the user finger can swipe up and down in a vertical direction to control the display object displayed on the screen of the electronic device to move up and down.

Figure 4:
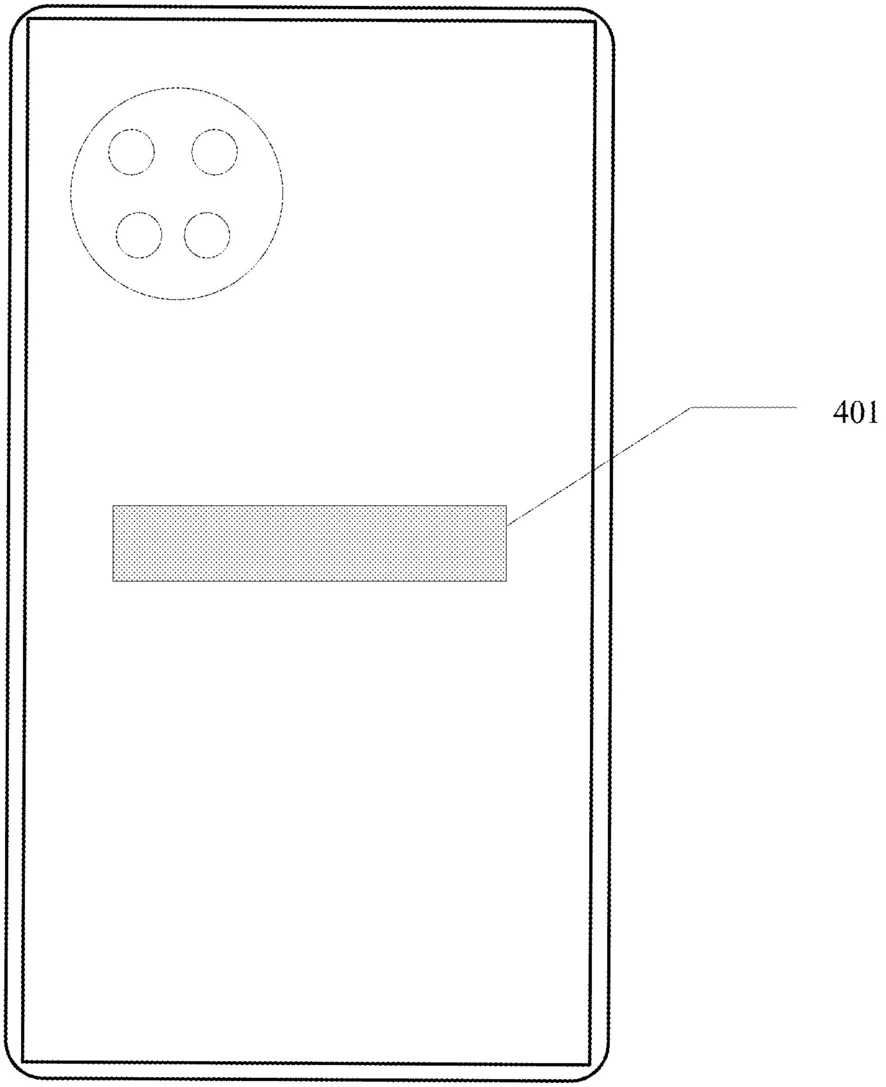
FIG. 4 illustrates another schematic diagram showing a collection area of a fingerprint sensor at an electronic device according to some embodiments of the present disclosure.

FIG. 4 illustrates another schematic diagram showing a collection area of a fingerprint sensor at an electronic device according to some embodiments of the present disclosure. The collection area 401 of the fingerprint sensor in FIG. 4 can be in a strip shape and parallel to the horizontal side of the electronic device. Thus, in the collection area of the fingerprint sensor, the user finger can swipe to the right and left along the horizontal direction to control the display object on the screen of the electronic device to move to the right and left.

In some embodiments, the touch event can indicate that the target finger touches the collection area of the fingerprint sensor. The target finger can be any finger touching the collection area of the fingerprint sensor.

A plurality of types of fingerprint sensors can be provided. Thus, the fingerprint sensor can sense the fingerprint in different methods, which is not limited. For example, the fingerprint sensor can collect the fingerprint image of the user. Based on this, if the fingerprint sensor collects the fingerprint image of the target finger, the touch event can be determined to be detected. For another example, the fingerprint sensor can sense the capacitor change generated when the finger touches the collection area. Based on the capacitor sensed in the collection area, whether the target finger touches the collection area of the fingerprint sensor can be determined.

At S102, in response to the touch event, direction information is obtained through the fingerprint sensor.

The direction information can indicate the swiping direction of the target finger relative to the collection area.

For example, when the collection area of the fingerprint sensor supports the finger to move up and down relative to the collection area, the swiping direction can be upward or downward. As shown in FIG. 2 and FIG. 3, the user finger can swipe up and down relative to the collection area, and the swiping direction of the user finger in the collection area can be upward or downward.

For another example, when the collection area of the fingerprint sensor supports the finger to swipe to the left and right relative to the collection area, in the collection area shown in FIG. 4, the user finger swipes to the left and right relative to the collection area. The swiping direction of the target finger relative to the collection area can be toward the left or right.

In the present disclosure, the fingerprint sensor determining the swiping direction of the target finger can include a plurality of methods, which are not limited in the present disclosure.

In some embodiments of the present disclosure, the first information of the first fingerprint feature point and the second information of the second fingerprint feature point can be obtained through the fingerprint sensor. Correspondingly, the direction information can be determined by comparing the first information of the first fingerprint feature point with the second information of the second fingerprint feature point.

For example, the first information and the second information can be fingerprint images of the target finger collected by the fingerprint sensor twice sequentially. Based on this, the first fingerprint feature point in the first information and the second fingerprint feature point in the second information can be feature points of the same fingerprint position point of the target finger in the two fingerprint images. Based on the first relative coordinate of the first fingerprint feature point relative to the collection area of the fingerprint sensor and the second relative coordinate of the second fingerprint feature point relative to the collection area, the swiping direction of the target finger relative to the collection area can be determined.

For example, if the collection area of the fingerprint sensor supports the finger to swipe up and down, assume that the coordinate axis in an up and down direction can be a y-axis, and the positive direction of the y-axis can be upward relative to the collection area. If the coordinate values of the first relative coordinate and the second relative coordinate at the y-axis can be merely compared, and if the y value in the second relative coordinate can be greater than the y value of the first relative coordinate, the target finger can be determined to swipe upward relative to the collection area.

For another example, the first information and the second information can be information of the position areas of the touch point capacitance collected twice by the fingerprint sensor in the collection area. The touch point capacitance can indicate the capacitance touched by the finger. Based on this, the first fingerprint feature point can be a feature point in the first position area having the touch point capacitance corresponding to the first information as a reference point. Similarly, the second fingerprint feature point can be a feature point in the second position area having the touch point capacitance corresponding to the second information as a reference point. For example, the reference point can be a center point of the position area having the touch point capacitance, which is not limited.

Based on this, based on the relative coordinates of the first fingerprint feature point and the second fingerprint feature point relative to the collection area of the fingerprint sensor, the swiping direction of the target finger can be determined, which is not repeated.

At S103, in response to the touch event, the start coordinate is obtained.

The start coordinate can be a coordinate in the display area of the screen not a coordinate in the non-collection area.

The target finger can perform the swiping operation in the collection area of the fingerprint sensor to control the display object of the screen of the electronic device to move up and down or right or left. To control the display object of the screen to move up and down or right and left, an operation body such as the user finger can perform the touch swiping operation in the screen of the electronic device or perform the roll operation by a mouse to control the movement of the display object in the screen. Based on this, to simulate the operation effects of the touching and swiping of the user finger on the screen or the mouse rolling, a coordinate of the display area of the screen can be determined in the present disclosure. Thus, the coordinate can be simulated as the start coordinate of an operation point such as the touch point or the cursor of the screen.

In the present disclosure, obtaining the start coordinate can include the following methods, For example, the start coordinate can be predetermined. Based on this, the determined coordinate can be directly obtained. For example, according to the size of the screen, the coordinate of the center point of the screen can be selected as the start coordinate.

For another example, a coordinate of a random point can be selected from the display area of the screen or the target sub-area determined in the display area.

At S104, based on the direction information and the start coordinate, at least one target coordinate is constructed until the fingerprint sensor obtains the leaving event.

The start coordinates and any one coordinate of the at least one target coordinate can be used to control the display object of the display area to move according to the direction indicated by the direction information.

For example, the electronic device can control the display object to move a corresponding distance along a corresponding direction according to the distance of the target coordinates obtained twice.

The leaving event can indicate that the target finger leaves the collection area of the fingerprint sensor.

When the target finger swipes in the collection area of the fingerprint sensor, to obtain the swiping state of the target finger in time, the fingerprint sensor can continuously collect the fingerprint images or capacitance information. Based on the fingerprint images or capacitance information collected by the fingerprint sensor consecutively, the swiping distance of the target finger to the collection area can be determined. Correspondingly, the coordinate information of the target finger can be continuously determined based on the swiping distances determined each time. The electronic device can perform a series of information processing according to the fingerprint images or capacitance information of the target finger continuously collected by the fingerprint sensor. Thus, a relatively large power consumption can be consumed. To reduce power consumption, the fingerprint images or capacitance information collected by the fingerprint sensor can be reduced, or the processing operations that need to be performed based on the information collected by the fingerprint sensor can be reduced.

Based on this, considering that as long as the swiping direction is determined and the target finger is not lifted when the target finger swipes in the collection area of the fingerprint sensor, the user may still need to control the display object of the screen to move along the swiping direction. Thus, in the present disclosure, the coordinate corresponding to the operation of controlling the display object to move can be continuously simulated in the screen. That is, the target coordinate of the touch point or operation point of controlling the display object to move in the screen can be continuously simulated at various moments, and the specific fingerprint coordinate of the target finger in the collection area of the fingerprint sensor may need to be considered. Then, the fingerprint images or capacitance information may not need to be collected by the fingerprint sensor, or the collected fingerprint images or the capacitance information may not need to be continuously processed.

Constructing target coordinates can be implemented in a plurality of methods. As long as the target coordinates constructed based on the start coordinate can indicate that the moving direction of the display object is consistent with the swiping direction.

In some embodiments, according to the direction information and based on a determined step size value added based on a (N−1)-th target coordinate, an N-th target coordinate can be constructed. N is a natural number greater than 1.

For the first target coordinate, the determined step size value can be added based on the direction information and the start coordinate to obtain the first target coordinate. The start coordinate can be used as the first target coordinate, which is not limited.

For example, assume that the determined step size value is 0.1, the direction information indicates that the swiping direction is upward, and the start coordinate is (x1, y1), x1 can be the coordinate of the x-axis corresponding to the start coordinate in the horizontal direction (i.e., the left and right direction), and y1 can be the coordinate of the y-axis corresponding to the start coordinate in the vertical direction (i.e., the up and down direction). Assume that the positive direction of the y-axis is vertically upward, the first target coordinate can be (x1, y1+0.1), and the second target coordinate can be (x1, y1+0.2), and so on and so forth, which is not repeated.

If the swiping direction is swiping downward, based on the start coordinate, the determined step size value can be gradually added to the negative direction of the y-axis. For example, the first target coordinate can be (x1, y1−0.1), and the second target coordinate can be (x1, y1−0.2).

In some embodiments, the step size values corresponding to different swiping directions can be different. For example, when the swiping direction is upward, the determined step size value can be 0.1, and when the swiping direction is downward, the determined step size value can be −0.1.

In the above, for example, the swiping direction can be the up and down direction. If the swiping direction is to the left or the right relative to the swiping area, based on the start coordinate, the determined complement value can be continuously added to the coordinate of the start coordinate on the x-axis according to the swiping direction, and y1 is unchanged, which is not repeated here.

In embodiments of the present disclosure, when the touch event of the target finger touching the collection area is obtained by the fingerprint sensor, a start coordinate of the screen can be obtained. Based on this, after the touch event is obtained, the direction information of the target finger swiping relative to the collection area can be obtained by the fingerprint sensor. Then, based on the direction information and the start coordinate, the target coordinates that are required to control the display object on the screen to move in the direction information can be automatically constructed, until the fingerprint sensor detects the leaving event. When the target finger swipes in the collection area of the fingerprint sensor, in the present disclosure, the touch event, the direction information, and the leaving event may only need to be obtained from the fingerprint sensor. The fingerprint features and coordinates of the target finger at different moments during the swiping process relative to the collection area may not need to be obtained through the fingerprint sensor. Thus, the fingerprint sensor may not need to frequently process and report the feature information of the fingerprint in the collection area. Then, power consumption is generated when the fingerprint sensor continuously obtains and reports the information of the fingerprint to reduce the power consumption of the electronic device.

In addition, as the fingerprint sensor technology continues to develop, fingerprint sensors can become smaller and smaller. The sensing area of the fingerprint sensor can be reduced. Thus, the fingerprint image or the capacitance change area collected by the fingerprint sensor can be relatively small. Then, the feature points of the fingerprint obtained by the fingerprint sensor can be reduced. The precision of the determined fingerprint coordinate can be affected by the fingerprint sensor. Thus, the curve of the fingerprint coordinate can fluctuate to affect the subsequent control of the display object in the screen. In the present disclosure, based on the direction information and the start coordinate, the target coordinate can be constructed, and the fluctuation can be effectively reduced, and the impact on the movement control of the display object can be reduced.

Since the collection area corresponding to the fingerprint sensor is relatively small, the user may seldom change the swiping direction during the swiping process of the fingerprint. However, considering the possibility of the swiping direction change during the fingerprint swiping process, to reduce the situation that the swiping direction of the target finger changes and the movement direction of the display object in the screen does not change, constructing the at least one target coordinate can include at least one of if the first time interval is satisfied, enabling the collection module of the fingerprint sensor, or if the first time interval is satisfied, obtaining the direction information through the fingerprint sensor.

Satisfying the first time interval can indicate that a time length between the moment of the nearest time of enabling the fingerprint sensor or obtaining the direction information through the fingerprint sensor and the current moment can reach the first time interval. The time length corresponding to the first time interval can be determined as needed, which is not limited.

Enabling the collection module of the fingerprint sensor can indicate that the fingerprint sensor can continue to collect the fingerprint information, e.g., continue to collect the fingerprint images or capacitance information, to cause the electronic device to continue to obtain the swiping situation of the target finger through the fingerprint sensor.

For example, by enabling the collection module of the fingerprint sensor to obtain the coordinate of the target finger relative to the collection area, the swiping direction of the target finger can be determined based on the current coordinate and the history coordinate of the target finger.

Similarly, if the time length between the current moment and the moment of obtaining the direction information of a last time can satisfy the first time interval, the direction information can be obtained through the fingerprint sensor of the present disclosure to obtain the current swiping direction of the target finger based on the currently obtained direction information.

After enabling the collection module of the fingerprint sensor or obtaining the direction information through the fingerprint sensor, in the present disclosure, the target coordinate can be constructed based on the most recently determined swiping direction of the obtained direction information, until the leaving event is obtained through the fingerprint sensor.

For example, to facilitate understanding, the collection area of the fingerprint sensor can support the swiping up and down. The step size value can be 0.1, and the coordinate system if the screen can be a coordinate system formed by x and y axes.

Assume that when the first time interval is satisfied, the most recently constructed target coordinate can be (x11, y11). The direction information determined in response to the touch event can indicate that the swiping direction is swiping upward, that is, swiping relative to the positive direction of the y axis. After enabling the collection module of the fingerprint sensor or obtaining the direction information through the fingerprint sensor, the swiping direction of the target finger can be still swiping upward. Then, the target coordinate that needs to be constructed after the current moment can be (x11, y11+0.1).

On the contrary, after enabling the collection module of the fingerprint sensor or obtaining the direction information through the fingerprint sensor, the swiping direction of the target finger can be changed to swiping downward. When the target coordinate is constructed again, based on the direction of swiping downward, based on the target coordinate (x11, y11) constructed last time, 0.1 can be added to the negative direction of the y axis. Thus, the constructed target coordinate can be (x11, y11−0.1).

In practical applications, in the electronic device, the display objects of the applications can be displayed in the display area of the screen can be controlled through the system (i.e., the operating system). Based on this, after obtaining the start coordinate, and when constructing the at least one target coordinate, the start coordinate and each coordinate of the at least one target coordinate can be provided to the interface of the target system.

In the system, the coordinates obtained via the target system interface can represent the coordinates generated by the touch apparatus corresponding to the screen. That is, in the system, the coordinates from the target system interface can be used as the coordinates sensed by the touch apparatus of the screen. Thus, by providing the coordinates to the target system interface, the operating system can consider that the coordinates from the target system interface are the coordinates generated by the touch apparatus of the screen. Then, the operating system can obtain the start coordinate and the target coordinate via the target system interface and control the display object in the screen to move in the swiping direction.

In some embodiments of the present disclosure, a second time interval can be set for reporting the coordinate to the target system interface. Correspondingly, according to the second time interval, the start coordinates and the target coordinates can be provided to the target interface.

Figure 5:
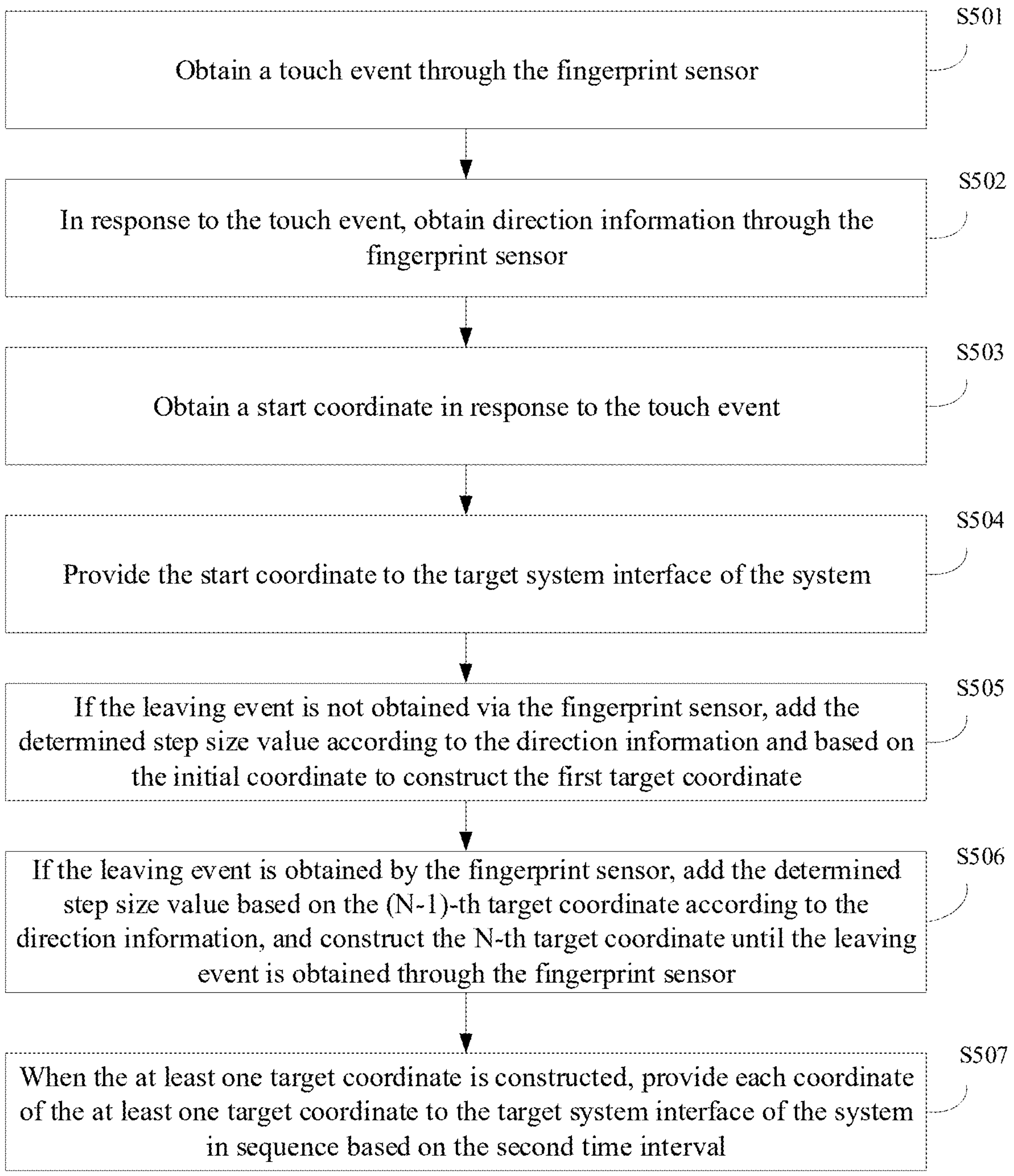
FIG. 5 illustrates a schematic flowchart of another processing method according to some embodiments of the present disclosure.

FIG. 5 illustrates a schematic flowchart of another processing method according to some embodiments of the present disclosure. The method includes the following processes.

At S501, a touch event is obtained through the fingerprint sensor.

The touch event can represent that the target finger touches the collection area of the fingerprint sensor.

At S502, in response to the touch event, direction information is obtained through the fingerprint sensor.

The direction information can represent the swiping direction of the target finger relative to the collection area.

At S503, a start coordinate is obtained in response to the touch event.

The start coordinate can be a coordinate in the display area of the screen.

For the details of steps S501 to S503, reference can be made to the above description, which is not repeated here.

At S504, the start coordinate is provided to the target system interface of the system.

The details of steps S501 to S503 refer to previous embodiments and will not be repeated here.

In embodiments of the present disclosure, after obtaining the start coordinate, providing the start coordinate to the target system interface of the operating system can be described as an example. In embodiments of the present disclosure, during constructing the at least one target coordinate, the start coordinates and the constructed target coordinates can be provided to the target system in sequence according to the second time interval, which is not limited here.

In the operating system, the start coordinate obtained via the target system interface can be used as the first coordinate generated by the touch apparatus of the screen for the touch event.

At S505, if the leaving event is not obtained via the fingerprint sensor, the determined step size value is added according to the direction information and based on the start coordinate to construct the first target coordinate.

Constructing the first target coordinate in another method can be also suitable for the present disclosure. For example, the start coordinate can be used as the first target coordinate, which is not limited.

At S506, if the leaving event is obtained by the fingerprint sensor, the determined step size value is added based on the (N−1)-th target coordinate according to the direction information, and the N-th target coordinate is constructed until the leaving event is obtained through the fingerprint sensor. N is a natural number greater than 1.

Any one coordinate of the start coordinate and the at least one target coordinate can be used to control the display object of the display area to move along the swiping direction indicated by the direction information.

For the details of steps S505 and S506, reference can be made to the above description, which is not repeated here.

In practical applications, no restriction may be applied to the moments of constructing the target coordinates. In some embodiments, since the constructed target coordinates need to be reported to the operating system, the target coordinates can be constructed sequentially according to the second time interval for reporting the coordinate to the target system interface. For example, the arrival of the coordinate construction moment can be determined according to the second time interval. Based on the last constructed target coordinate, the target coordinate can be constructed.

At S507, when the at least one target coordinate is constructed, each coordinate of the at least one target coordinate is provided to the target system interface of the system in sequence based on the second time interval.

For example, the second time interval can be 0.01 milliseconds. After providing the start coordinate to the target system interface, the first target coordinate can be provided to the target system interface 0.01 milliseconds after the start coordinate is provided. Similarly, after the first target coordinate is provided to the target system interface, the second target coordinate can be provided to the target system interface 0.01 milliseconds later, and so on, until the leaving event is obtained.

If the target coordinates are constructed according to the second time interval, each time when the target coordinate is constructed, the target coordinate can then be provided to the target system interface at that interval to provide the target coordinates to the target system interface according to the second time interval.

The coordinates obtained by the operating system via the target system interface can represent the coordinates generated by the touch apparatus corresponding to the screen. Thus, the operating system can control the display object to move according to the touch coordinates generated by the touch apparatus.

In the present disclosure, the time length of the second time interval can be set as needed.

The second time interval can be dynamically updated. Since the user has different operation behaviors in different time segments, in some time segments, the user can have a faster swiping speed in the collection area of the fingerprint sensor. In some time intervals, the swiping speed can be relatively slow. Based on this, to appropriately determine the target coordinate, and to cause the target coordinates to better match the swiping speed of the user in the collection area of the fingerprint sensor, the time length of the second time interval can be updated periodically or irregularly.

Figure 6:
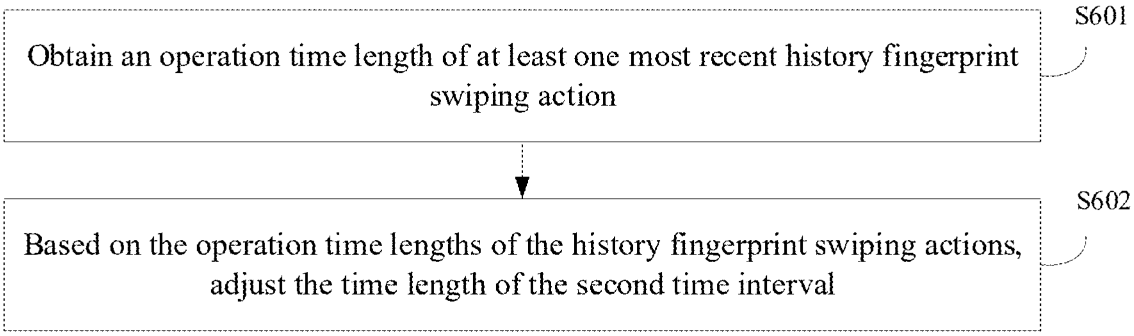
FIG. 6 illustrates a schematic flowchart of adjusting a second time interval according to some embodiments of the present disclosure.

FIG. 6 illustrates a schematic flowchart of adjusting the second time interval according to some embodiments of the present disclosure. Adjusting the second time interval includes the following processes.

At S601, an operation time length of at least one most recent history fingerprint swiping action is obtained.

For example, the operation time length of the fingerprint swiping action sensed by the fingerprint sensor over the most recently determined time segment (e.g., within one day or one week) can be obtained. Since the information of past fingerprint swiping actions is required to update the second time interval, the most recent fingerprint swiping actions can be referred to as the history fingerprint swiping actions.

A history fingerprint swiping action can include a pair of a history touch event and a history leaving event.

The operation time length of the history fingerprint swiping action can be a time length between the first event timestamp of the history touch event and the second event timestamp of the history leaving event in that swiping action.

The first event timestamp of the history touch event can be the moment when the fingerprint sensor detects the history touch event, and the second event timestamp of the history leaving event is the moment when the fingerprint sensor detects the history leaving event.

To determine the operation event corresponding to each history fingerprint swiping action in time, in the present disclosure, each time the touch event is obtained via the fingerprint sensor, the first event moment of the touch event can be determined. Similarly, the leaving event corresponding to the touch event may need to be obtained via the fingerprint sensor, and the second event moment of the leaving event can be determined, and the operation time length of the fingerprint swiping action can correspond to the touch event and the leaving event.

For example, in step S501, the first event moment of the touch event is determined, and in step S506, when the leaving event is obtained, the second event moment of the leaving event is determined. The operation time length of the fingerprint swiping action formed by the touch event and the leaving event can be determined based on the first event moment and the second event moment.

At S602, based on the operation time lengths of the history fingerprint swiping actions, the time length of the second time interval can be adjusted.

For example, if the operation time lengths of the history fingerprint swiping actions indicate that the swiping speed of the user finger is smaller than the target speed, the time length of the second time interval can be appropriately reduced. If the operation time lengths of the history fingerprint swiping actions indicate that the swiping speed of the user finger is not smaller than the target speed, the time length of the second time interval can be increased, or the second time interval can be maintained at the determined target time interval.

For another example, in the present disclosure, the target number of the history fingerprint swiping actions with the operation time lengths exceeding the determined time length threshold can be determined. If the target number does not exceed the determined reference number, the second time interval can be maintained at the target time interval.

If the target number exceeds the determined reference number, in connection with the target number, the reference number, and the first time length currently corresponding to the second time interval, the second time length to which the second time interval needs to be adjusted can be determined. The second time length can be smaller than the first time length. Then, the time length of the second time interval can be determined as the second time length.

For example, the second time length T to which the second time interval needs to be adjusted can be calculated through formula 1:

$$T = \frac{50}{\ln\left(200 - \sum_{i=1}^{n+s-1} \Delta t_i / s\right)} \tag{1}$$

where, $\Delta t_i$ denotes the first time length corresponding to the i-th history fingerprint swiping action with the operation time length exceeding the determined time length threshold, n denotes the target number, and s denotes the reference number.

The above description is made by taking the two methods of adjusting the time length of the second time interval as examples. In practical applications, other methods of adjusting the second time interval can be provided, which is not limited here.

Similar to adjusting the second time interval, to adapt to different swiping speeds of the user, in the present disclosure, the determined step size value can be adjusted. That is, the step size value can be adjusted based on the operation time length of the most recent history fingerprint swiping action.

For example, if the operation time lengths of the history fingerprint swiping actions indicate that the swiping speeds of the user finger are smaller than the target speed, the step size value can be appropriately reduced. If the operation time lengths of the history fingerprint swiping actions indicate that the swiping speed of the user finger is not smaller than the target speed, the step size value can be increased, or maintained at the determined target value.

For another example, in the present disclosure, the target number of the history fingerprint swiping actions with the operation time lengths exceeding the determined time threshold can be determined as the target number. If the target number does not exceed the determined reference number, the step size value can be maintained unchanged.

If the target number exceeds the determined reference number, based on the operation time lengths corresponding to the target number of history fingerprint swiping actions, the reference number, and the first value of the step size value, the second value to which the step size value needs to be adjusted can be determined. The second value can be greater than the first value.

For example, the second value D2 to which the step size value needs to be adjusted can be calculated through formula 2:

$$D2 = D1 * \ln\left(200 - \sum_{i=1}^{n+s-1} \Delta t_i / s\right) \tag{2}$$

where D1 denotes the first value of the step size value, and for the meanings of other parameters, reference can be made to formula 1.

If different swiping directions correspond to different step size values, negative and positive step size values can be provided. The value of the step size value and the value to which the step size value needs to be adjusted can be absolute values of the step size values.

In some embodiments, the time for the user to perform the swiping operation in the collection area of the fingerprint sensor can be relatively short. If the user touches the collection area of the fingerprint sensor by mistake or unintentionally, the user finger can touch the collection area for a long time. Thus, the target coordinates can be continuously constructed in the electronic device by applying the solution of the present disclosure. Then, the operating system can be triggered to continuously control the display object to move in the screen based on the target coordinates, which can lead to a false processing operation and waste of power consumption.

Based on this, in the present disclosure, the target moment of the fingerprint sensor detecting the touch event can be determined. Before the fingerprint sensor obtains the leaving event, if the time length between the current moment and the target moment is greater than the determined maximum swiping time length, the operation of constructing the target coordinates can also be ended without waiting to detect the leaving event. Thus, the negative impact caused by the false operation can be reduced.

On another aspect, the present disclosure further provides an electronic device.

Figure 7:
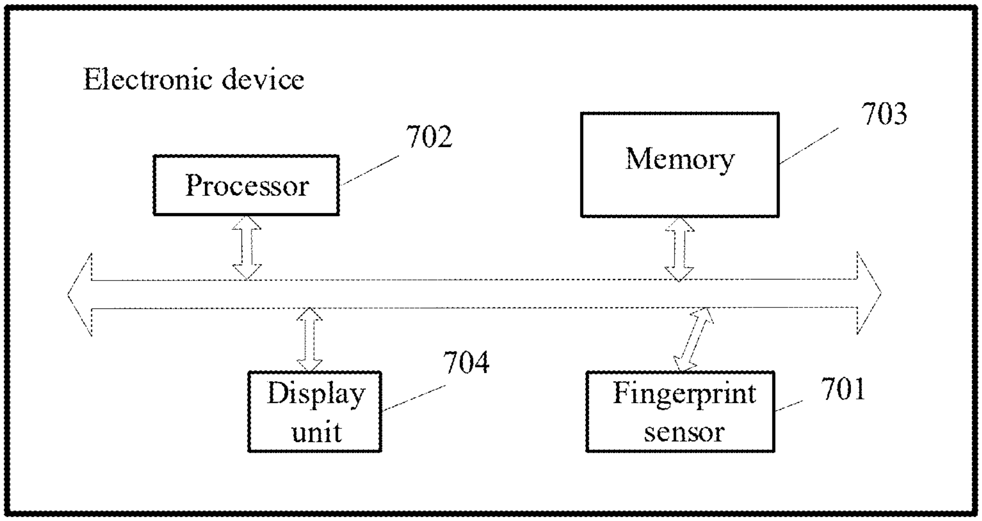
FIG. 7 illustrates a schematic structural diagram of an electronic device according to some embodiments of the present disclosure.

FIG. 7 illustrates a schematic structural diagram of an electronic device according to some embodiments of the present disclosure.

As shown in FIG. 7, the electronic device includes a fingerprint sensor 701 and one or more processors 702.

The fingerprint sensor 701 can be configured to obtain the touch event. The touch event can indicate that the target finger touches the collection area of the fingerprint sensor. The fingerprint sensor 701 can further be configured to determine the direction information in response to the touch event and obtain the leaving event. The direction information can indicate the swiping direction of the target finger relative to the collection area.

The one or more processors 702 can be configured to obtain the touch event and the direction information reported by the fingerprint sensor and obtain the start coordinate in response to the touch event. The start coordinate can be a coordinate in the display area of the screen. The one or more processors 702 can be further configured to construct the at least one target coordinate based on the direction information and the start coordinate until the leaving event is obtained through the fingerprint sensor. Any one of the start coordinates and the at least one target coordinate can be used to control the display object in the display area to move according to the direction indicated by the direction information.

In some embodiments, the electronic device further includes one or more memories 703. The one or more memories 703 can be used to store programs required by the one or more processors for performing operations.

Further, the electronic device further includes a display unit 704. The display unit 704 can include a touch apparatus, which is not limited.

The electronic device can further include other members, which are not limited.

The fingerprint sensor of the electronic device of the present disclosure can be arranged at another area outside the screen, which is not limited.

For example, in some embodiments, the fingerprint sensor can be arranged at the side surface of the target body of the electronic device. The target body can be a body of the electronic device that has the screen. The side surface of the target body can be perpendicular to the plane where the screen is arranged.

For example, as shown in FIG. 2, the fingerprint sensor and the collect area of the fingerprint sensor can be arranged at the vertical side surface of the electronic device.

In some other embodiments, as shown in FIG. 3 and FIG. 4, the fingerprint sensor is arranged at the back surface of the target body of the electronic device, which is not repeated here.

In some embodiments, the one or more processors can be configured to add the determined step size value based on the (N−1)-th target coordinate according to the direction information and construct the N-th target coordinate based on the direction information and the start coordinate. N is a nature number greater than 1.

In some other embodiments, when constructing the at least one target coordinate based on the direction information and the start coordinate, the one or more processors can be further configured to perform at least one of enabling the collection module of the fingerprint sensor if the first time interval is satisfied or obtaining the direction information through the fingerprint sensor if the first time interval is satisfied.

In some other embodiments, the one or more processors can be further configured to provide the start coordinate and each coordinate of the at least one target coordinates to the target system interface. The coordinates obtained by the system through the target system interface can represent the coordinates generated by the touch apparatus corresponding to the display screen.

In some other embodiments, when providing the start coordinate and each coordinate of the at least one target coordinate to the target system interface, the one or more processors can be configured to base on the second time interval, provide the start coordinate and each coordinate of the at least one target coordinates to the target system interface. The second time interval can be dynamically updated.

In some other embodiments, the one or more processors can be further configured to update the second time interval by obtaining the operation time length of the at least one history fingerprint swiping action and adjusting the time length of the second time interval based on the operation time lengths of the history fingerprint swiping actions. The history fingerprint swiping action can include a history touch event and a history leaving event. The operation time length can be the time length from the first event moment of the history touch event of the history fingerprint swiping action to the second event moment of the leaving event of the history fingerprint swiping action.

The fingerprint sensor can be further configured to obtain the first information including the first fingerprint feature point and the second information including the second fingerprint feature point.

When determining the direction information, the fingerprint sensor can be further configured to compare the first fingerprint feature point and the second fingerprint feature point to determine the direction information.

The one or more processors can be further configured to determine the target moment of the touch event detected by the fingerprint sensor, and if the time length between the current moment and the target moment exceeds the determined maximum swiping time length, end the operation of constructing the target coordinate.

On another aspect, the present disclosure further provides a computer-readable storage medium. The computer-readable storage medium stores at least one instruction, at least one segment of program, a code set, or an instruction set. The at least one instruction, the at least one segment of program, the code set, or the instruction set can be loaded and executed by the one or more processors to implement the processing method above.

The present disclosure further provides a computer program. The computer program can include the computer instructions stored in the computer-readable storage medium. When the computer program is executed on the electronic device, the above processing method can be executed.

In the present disclosure, terms "first," "second," "third," "fourth," etc. (if present) in the specification, claims, and accompanying drawings are used to distinguish similar parts and do not necessarily specify a particular sequence or order. The data used with these terms can be interchangeable. Thus, embodiments of the present disclosure can be implemented in orders different from those illustrated here.

Embodiments of the present disclosure described in this specification are described in a progressive manner. Each embodiment focuses on differences from other embodiments. Similar parts among embodiments of the present disclosure can be referenced to each other. Meanwhile, the features of embodiments of the present disclosure can be interchanged or combined to enable those skilled in the art to implement or utilize the present disclosure. Since apparatus embodiments are similar to the method embodiments, the description of the apparatus embodiments is simple. For the relevant parts, reference can be made to the description of the method embodiments.

In the specification, relational terms such as "first" and "second" are solely used to distinguish one entity or operation from another entity or operation and do not necessarily imply any actual relationship or sequence among these entities or operations. Furthermore, the terms "including," "comprising," or any other variants, are intended to cover a non-exclusive inclusion, such that a process, method, article, or device that includes a series of elements includes not only those elements but also others elements not explicitly listed or elements inherent to such the process, method, article, or device. The element defined by the phrase "includes a . . . " does not exclude the existence of additional identical elements in the process, method, article, or device.

The description of embodiments of the present disclosure enables those skilled in the art to realize or use the present disclosure. Various modifications to embodiments of the present disclosure are apparent to those skilled in the art. The general principle defined in the specification can be implemented in other embodiments without departing from the spirit or scope of the present disclosure. Thus, the present disclosure is not limited to embodiments of the present disclosure but conforms to the widest scope consistent with the principles and novel features of the present disclosure.

The above are some embodiments of the present disclosure. For those ordinary skills in the art, various improvements and modifications can be made to embodiments of the present disclosure without departing from the principle of the present disclosure. These improvements and modifications are within the scope of the present disclosure.

What is claimed is:

1. A processing method comprising:

obtaining a touch event through a fingerprint sensor, the touch event representing a target finger touching a collection area of the fingerprint sensor, the collection area being an area in which the target finger performs a swiping operation, and the collection area being located outside a display area of a screen;

in response to the touch event, obtaining direction information through the fingerprint sensor, the direction information representing a swiping direction of the target finger relative to the collection area;

in response to the touch event, obtaining a start coordinate, the start coordinate being in the display area of the screen; and based on the direction information and the start coordinate, constructing at least one target coordinate until a leaving event is obtained through the fingerprint sensor, any one coordinate of the start coordinate and the at least one target coordinate being used to control a display object in the display area to move in a direction indicated by the direction information.

2. The processing method of claim 1, wherein constructing the at least one target coordinate based on the direction information and the start coordinate includes:

adding a determined step size value based on an (N−1)-th target coordinate according to the direction information, and constructing an N-th target coordinate, N being a natural number greater than 1.

3. The processing method of claim 2, further comprising:

obtaining an operation time length of at least one most recent history fingerprint swiping action, the history fingerprint swiping action including a history touch event and a history leaving event, and the operation time length being a time length from a first event moment of the history touch event of the history fingerprint swiping action to a second event moment of the history leaving event of the history fingerprint swiping action; and adjusting the step size value based on the operation time length of the at least one history fingerprint swiping action.

4. The processing method of claim 1, wherein constructing the at least one target coordinate based on the direction information and the start coordinate includes at least one of:

in response to a first time interval being satisfied, enabling a collection module of the fingerprint sensor; or in response to the first time interval being satisfied, obtaining the direction information through the fingerprint sensor.

5. The processing method of claim 1, further comprising:

providing each coordinate of the start coordinate and the at least one target coordinate to a target system interface, coordinates obtained by a system through the target system interface representing coordinates generated by a touch apparatus corresponding to the screen.

6. The processing method of claim 5, wherein providing each coordinate of the start coordinate and the at least one target coordinate to the target system interface includes:

providing each coordinate of the start coordinate and the at least one target coordinate to the target system interface based on a second time interval, the second time interval being dynamically updated.

7. The processing method of claim 6, wherein updating the second time interval includes:

obtaining an operation time length of at least one most recent history fingerprint swiping action, the history fingerprint swiping action including a history touch event and a history leaving event, and the operation time length being a time length from a first event moment of the history touch event of the history fingerprint swiping action to a second event moment of the history leaving event in the history fingerprint swiping action; and adjusting a time length of the second time interval based on time lengths of the history fingerprint swiping action.

8. The processing method of claim 1, wherein obtaining the direction information through the fingerprint sensor includes:

obtaining first information including a first fingerprint feature point and second information including a second fingerprint feature point through the fingerprint sensor; and comparing the first fingerprint feature point with the second fingerprint feature point to determine the direction information.

9. The processing method of claim 1, further comprising:

determining a target moment when the fingerprint sensor detects the touch event; and in response to a time length from a current moment to the target moment exceeding a maximum swiping time length, ending an operation of constructing the target coordinate.

10. The processing method of claim 1, wherein constructing the at least one target coordinate includes automatically constructing the at least one target coordinate during a period after the direction information is obtained and until the leaving event is obtained through the fingerprint sensor.

11. The processing method of claim 10, wherein the at least one target coordinate is automatically constructed based on the direction information and the start coordinate without requiring the fingerprint sensor to repeatedly obtain fingerprint features and coordinates of the target finger during the period.

12. An electronic device comprising:

a fingerprint sensor configured to:

obtain a touch event, the touch event representing that a target finger touches a collection area of the fingerprint sensor, the collection area being an area in which the target finger performs a swiping operation, and the collection area being located outside a display area of a screen;

in response to the touch event, determine direction information, the direction information representing a swiping direction of the target finger relative to the collection area; and obtain a leaving event; and one or more processors configured to:

obtain the touch event and the direction information reported by the fingerprint sensor;

in response to the touch event, obtain a start coordinate, the start coordinate being in the display area of the screen;

construct at least one target coordinate based on the direction information and the start coordinate until the fingerprint sensor obtains the leaving event, any one coordinate of the start coordinate and the at least one target coordinate being used to control a display object of the display area to move in a direction indicated by the direction information.

13. The device of claim 12, wherein the one or more processors are further configured to:

add a determined step size value based on an (N−1)-th target coordinate according to the direction information, and construct an N-th target coordinate, N being a natural number greater than 1.

14. The device of claim 12, wherein the one or more processors are further configured to perform at least one of:

in response to a first time interval being satisfied, enabling a collection module of the fingerprint sensor; or in response to the first time interval being satisfied, obtaining the direction information through the fingerprint sensor.

15. The device of claim 12, wherein the one or more processors are further configured to:

provide each coordinate of the start coordinate and the at least one target coordinate to a target system interface, coordinates obtained by a system through the target system interface representing coordinates generated by a touch apparatus corresponding to the screen.

16. The device of claim 15, wherein the one or more processors are further configured to:

provide each coordinate of the start coordinate and the at least one target coordinate to the target system interface based on a second time interval, the second time interval being dynamically updated.

17. The device of claim 16, wherein the one or more processors are further configured to:

obtain an operation time length of at least one most recent history fingerprint swiping action, the history fingerprint swiping action including a history touch event and a history leaving event, and the operation time length being a time length from a first event moment of the history touch event of the history fingerprint swiping action to a second event moment of the history leaving event in the history fingerprint swiping action; and adjust a time length of the second time interval based on time lengths of the history fingerprint swiping action.

18. The device of claim 12, wherein the one or more processors are further configured to:

obtain first information including a first fingerprint feature point and second information including a second fingerprint feature point through the fingerprint sensor; and compare the first fingerprint feature point with the second fingerprint feature point to determine the direction information.

19. The device of claim 12, wherein the one or more processors are further configured to:

determine a target moment when the fingerprint sensor detects the touch event; and in response to a time length from a current moment to the target moment exceeding a maximum swiping time length, end an operation of constructing the target coordinate.

20. A non-transitory computer-readable storage medium storing a computer program that, when executed by one or more processors, causes the one or more processors to:

obtain a touch event through a fingerprint sensor, the touch event representing a target finger touching a collection area of the fingerprint sensor, the collection area being an area in which the target finger performs a swiping operation, and the collection area being located outside a display area of a screen;

in response to the touch event, obtain direction information through the fingerprint sensor, the direction information representing a swiping direction of the target finger relative to the collection area;

in response to the touch event, obtain a start coordinate, the start coordinate being in the display area of the screen; and based on the direction information and the start coordinate, construct at least one target coordinate until a leaving event is obtained through the fingerprint sensor, any one coordinate of the start coordinate and the at least one target coordinate being used to control a display object in the display area to move in a direction indicated by the direction information.

* * * * *